United States Patent
Reihs

(10) Patent No.: US 7,563,505 B2
(45) Date of Patent: Jul. 21, 2009

(54) LONG-TIME STABLE WATER-REPELLENT AND OIL-REPELLENT SURFACE

(75) Inventor: Karsten Reihs, Köln (DE)

(73) Assignee: Sunyx Surface Nanotechnologies GmbH, Cologne (DE)

( * ) Notice: Subject to any disclaimer, the term of this patent is extended or adjusted under 35 U.S.C. 154(b) by 1026 days.

(21) Appl. No.: 10/204,661

(22) PCT Filed: Feb. 8, 2001

(86) PCT No.: PCT/EP01/01339

§ 371 (c)(1),
(2), (4) Date: Aug. 21, 2002

(87) PCT Pub. No.: WO01/62682

PCT Pub. Date: Aug. 30, 2001

(65) Prior Publication Data

US 2003/0026972 A1   Feb. 6, 2003

(30) Foreign Application Priority Data

Feb. 21, 2000   (DE) ................................ 100 07 859

(51) Int. Cl.
*B32B 27/00* (2006.01)
*A61L 9/04* (2006.01)

(52) U.S. Cl. .............. 428/319.3; 428/319.1; 428/319.7; 428/315.7; 428/316.6; 428/131; 239/34; 239/57

(58) Field of Classification Search ............. 428/307.3, 428/312.8, 315.5, 315.7, 410, 421, 426, 319.1, 428/319.3, 319.7, 316.6, 131; 239/34, 57
See application file for complete search history.

(56) References Cited

U.S. PATENT DOCUMENTS

| | | | |
|---|---|---|---|
| 3,644,574 A |   | 2/1972 | Jackson et al. ............... 260/873 |
| 4,537,817 A | * | 8/1985 | Guillaume ................... 442/63 |
| 4,562,794 A | * | 1/1986 | Speckman .................. 119/651 |
| 4,725,418 A | * | 2/1988 | Friemel et al. .............. 423/305 |
| 5,415,927 A |   | 5/1995 | Hirayama et al. ......... 428/307.3 |
| 5,437,894 A | * | 8/1995 | Ogawa et al. ............... 427/535 |
| 5,455,043 A | * | 10/1995 | Fischel-Ghodsian ........ 424/448 |
| 5,853,800 A | * | 12/1998 | Dombrowski et al. ....... 427/162 |
| 6,180,127 B1 | * | 1/2001 | Calton et al. ................ 424/409 |

FOREIGN PATENT DOCUMENTS

WO   WO 00/39240   7/2000

OTHER PUBLICATIONS

"Methoden Der Organischen Chemie" (Organic Chemistry Methods) Houben-Weyl, vol. 14/1, Thieme Verlag, 1961, pp. 390-406.

\* cited by examiner

*Primary Examiner*—Hai Vo

(57) ABSTRACT

The present invention relates to a long-time stable, hydrophobic or oleophobic surface and to the use thereof.

34 Claims, 1 Drawing Sheet

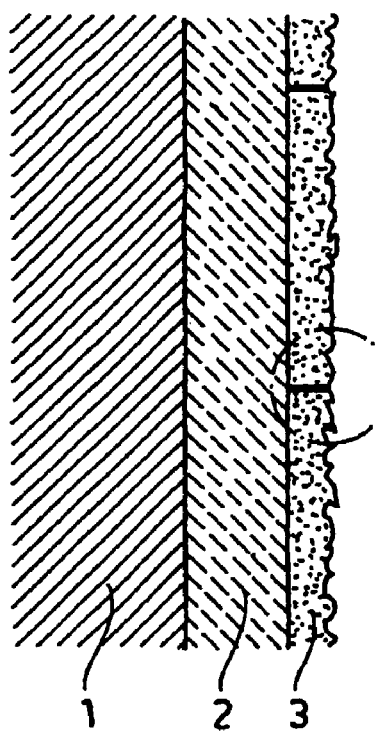
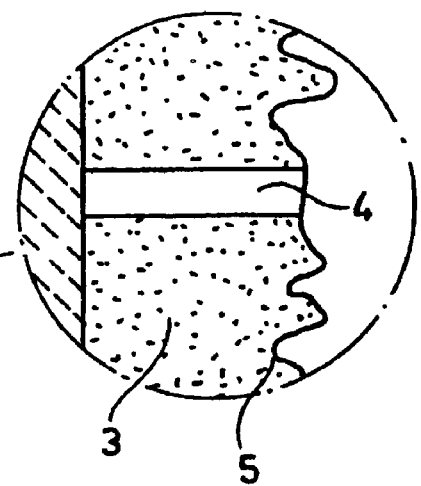

LONG-TIME STABLE WATER-REPELLENT AND OIL-REPELLENT SURFACE

This application claims the benefit of the earlier filed International Application No. PCT/EP01/01339, International Filing Date, Feb. 8, 2001, which designated the United States of America, and which international application was published under PCT Article 21(2) as WO Publication No. WO 01/62682 A1.

This invention relates to a long-term stable water-repellent and/or oil-repellent surface and its utilisation.

For purposes of the invention, a water-repellent material is a material which, on a flat, non-structured surface, exhibits a boundary angle in relation to water of greater than 90°.

An oil-repellent material for purposes of the invention is a material which, on a flat, non-structured surface, exhibits a boundary angle in relation to long-chain n-alkanes, such as n-decane, of greater than 90°.

Such surfaces can, for example, be used on windows in cars, if they are simultaneously transparent. In rain, the water-repellent property leads to the formation of droplets which can be removed by the slipstream, thus greatly improving visibility in rain.

Consequently, there have been many attempts to make such water-repellent and oil-repellent surfaces available. For example, in the publication by A. Hozumi, H. Sekoguchi, N. Kakinoki and O. Takai in Journal of Materials Science 32, 4253-4259 (1997), there is described a process by means of which transparent substrates are coated with a thin transparent water-repellent film. The film is produced by radio-frequency-supported CVD (chemical vapour deposition) of perfluoroalkyl compounds, and produces a water boundary angle of 107°.

Furthermore, the teaching of U.S. Pat. No. 5,688,864 (Patent holder: PPG Industries), indicates how glass surfaces can be rendered water-repellent using perfluoroalkyl silanes. For this purpose, the compound is applied in a solvent to the glass surface, in which process there is reaction between the silane and the surface. After treatment, the silane has a water boundary angle of 115°.

However, surfaces produced by means of this process suffer from the disadvantage that the contact angle of a droplet residing on the surface will greatly decrease over a period of time. Consequently, efforts have frequently been made to extend the durability of the water-repellent coating. The teaching of U.S. Pat. No. 5,980,990 in this context is that pre-treatment of the glass surface with an acid, followed by reaction with a water-repellent silane, will produce markedly improved long-term stability.

However, the durability of these films is restricted to a few months under normal use. PPG Industries for example recommends, in its operating instructions for its Aquapel© product which is described as being very durable, that the coating should be renewed after a few months, under normal use.

From this we derived the task of making available water-repellent and/or oil-repellent surfaces and processes for their production which exhibit a contact angle >90°, which remain stable over many years, even under heavy loading.

In accordance with the invention, this function is achieved by the production of a surface which is described for purposes of example in FIG. 1. On a carrier (e.g. glass or a polymer such as polycarbonate) there is a reservoir coating in which a repellent agent is dissolved and freely moveable, which is water-repellent and/or oil-repellent. A further coating (covering coating) covers the reservoir coating in relation to outside. Through pores in the covering coating, the repellent agent in the reservoir coating will diffuse to the outer surface, where it will create an outer coating. The surface of this coating exhibits a boundary angle >90° in relation to water.

The subject of the invention is a long-term stable water-repellent or oil-repellent surface constructed at least from a substrate with a reservoir coat arranged on it, which contains a repellent agent, a covering coating arranged over it and having pores, or being permeable to the repellent agent, and an outer coat which is made up of the repellent agent.

In the case of surfaces according to prior art, the water-repellent coat is slowly broken down, for example, due to weathering. This greatly limits its useful life. Under this invention, it was, however, surprisingly found that fresh repellent agent was continuously supplied for the outer coating through the pores, which consistently precisely compensated for the breakdown, provided that material was still present in the reservoir coating. The boundary angle also remains stable thanks to the supply of fresh repellent agent.

The surface of the covering coating particularly advantageously exhibits a surface topography as defined in the international patent application whose case reference is PCT/99/10322. Surface topography is constructed such that the value of an integral of a function S $$S(\log f) = a(f) \cdot f$$

which states a relationship between local frequencies f of the individual Fourier components and their amplitudes a(f), between integration limits $\log(f_1/\mu m^{-1}) = -3$ and $\log(f_2/\mu m^{-1}) = 3$, is at least 0.3.

In this case, the boundary angle in relation to water is markedly higher than that of a non-structured, flat surface.

The reservoir coating preferably has a thickness in the range of 0.1 μm to 10,000 μm particularly preferably in the range of 1 μm to 2,000 μm, quite particularly advantageously in the range of 10 μm to 1,000 μm and especially advantageously in the range of 50 μm to 500 μm.

Preferably, the covering coating has a thickness in the range of 0.01 μm to 100 μm, preferably in the range of 0.02 μm to 50 μm, particularly preferably in the range of 0.05 μm to 20 μm and quite especially preferably in the range of 0.1 μm to 10 μm.

The pores 4 can exhibit in transverse section along their longitudinal axis a cylindrical or conical form or any other desired form. At the boundary surface to the reservoir coating, which may independently be the same or different at the boundary surface in relation to the outer coating of $10^{-5}$ μm$^2$ up to $10^6$ μm$^2$, preferably of $4 \times 10^{-4}$ μm$^2$ to $4 \times 10^4$ μm$^2$, particularly preferably from $1 \times 10^{-2}$ μm$^2$ up to $1 \times 10^4$ μm$^2$ and quite exceptionally advantageously from $2 \times 10^4$ μm$^2$ to $2 \times 10^3$ μm$^2$.

The number of pores per surface is in particular from 2 mm$^{-2}$ to $10^{-4}$ mm$^{-2}$, preferably from 1 mm$^{-2}$ to $10^{-3}$ mm$^{-2}$, and particularly advantageously from 0.5 mm$^{-2}$ to $10^{-2}$ mm$^{-2}$.

The pores are preferably produced by ablation with lasers, particularly preferably using ultraviolet laser, and quite exceptionally preferably produced by ultraviolet laser in the wavelengths of 308 nm, 266 nm, 248 nm, 213 nm, 193 nm or 157 nm.

In a further preferred method, pores 4 are produced by lithography using masks with chemical etching methods.

The substrate consists of any desired material which can be coated for water-repellent and/or oil-repellent properties. The substrate preferably consists of a transparent material, especially transparent glass, plastic or ceramics.

The reservoir coating is in particular an open/porous coating of metal or an open/porous coating of a ceramic material, or consists of a duroplastic or thermoplastic synthetic material. Preferably, the reservoir coating consists of a transparent material, particularly transparent glass, plastic or ceramics.

A particularly preferred metal to be selected for the reservoir coating and/or the substrate can be taken from the following range: beryllium, magnesium, scandium, titanium, vanadium, chromium, manganese, iron, cobalt, nickel, copper, zinc, gallium, yttrium, zircon, niobium, molybdenum, technetium, ruthenium, rhenium, palladium, silver, cadmium, indium, tin, lanthanum, cerium, praseodymium, neodymium, samarium, europium, gadolinium, terbium, dysprosium, holmium, erbium, thulium, ytterbium, lutecium, hafnium, tantalum, tungsten, rhenium, osmium, iridium, platinum, gold, thallium, lead, bismuth, particularly titanium, aluminium, magnesium, nickel or any possible alloy of the above mentioned metals.

Metal oxides, metal carbides, metal nitrides, metal sulphides, metal fluorides of the above-mentioned metals, and compounds of these materials, are particularly suitable as ceramic materials for the reservoir coating and/or the substrate.

The preferred duroplastic synthetic material can be obtained particularly from the following range: diallylphthalate resin, epoxy resin, uric acid-formaldehyde, melamine formaldehyde resin, melamine phenol formaldehyde resin, phenol formaldehyde resin, polyamide, silicon rubber and non-saturated polyester resin.

The preferred thermoplastic synthetic material is selected in particular from the following range: thermoplastic polyolefin, e.g. polypropylene or polyethylene, polycarbonate, polyester carbonate, polyester (e.g. PBT or PET), polystyrene, styrene copolymer, SAN resin, styrene graft copolymer, e.g. ABS polymer, polyamide, polyurethane, polyphenylene sulphide, polyvinyl chloride or any possible mixtures of the above mentioned polymers.

In particular, the following thermoplastic polymers are suitable as substrates for the surface as per the invention:

Polyolefins such as high and low density polyethylene, e.g. densities from 0.91 g/cm³ to 0.97 g/cm³, which can be produced according to known processes, Ullmann (4.) 19, pages 167 and following pages, Winnacker-Kückler (4.) 6, 353 to 367, Elias & Vohwinkel, Neue Polymere Werkstoffe für die industrielle Anwendung, (New polymer materials for industrial applications), Munich, Hanser 1983.

Furthermore, polypropylene materials with molecular weights of 10,000 g/mol to 1,000,000 g/mol, which can be manufactured according to known processes, Ullmann (5.) A.10, pages 615 and following pages, Houben-Weyl E20/2, pages 722 and following pages, Ullmann (4.) 19, pages 195 and following pages, Kirk-Othmer (3.) 16, pages 357 and following pages.

However, it is also possible to use copolymerisates of the above mentioned olefins, or those with further alpha-olefins, such as—for example—polymers of ethylene with butylene, hexene and/or octene, EVA (ethylene vinyl acetate copolymerisate), EBA (ethylene ethyl acrylate copolymerisate), EEA (ethylene butyl acrylate copolymerisate), EAS (acrylate ethylene copolymerisate), EVK (ethylene vinyl carbazol copolymerisate), EPB (ethylene propylene block copolymers), EPDM (ethylene propylene diene copolymerisate), PB (polybutylene), PMP (polymethyl pentene), PIB (poly isobutylene), NBR (acryl nitrile butadiene copolymerisate), polyisoprene, methyl-butylene copolymerisate, isoprene isobutylene copolymerisate.

Manufacturing methods: such polymerisates are, for example, published in the Kunststoff-Handbuch (=Plastics Manual), Volume IV, Munich, Hanser Verlag, Ullmann (4.) 19, pages 167 and following pages, Winnacker-Kückler (4.) 6, 353 to 367, Elias & Vohwinkel, Neue Polymere Werkstoffe, (=New Polymer Materials), Munich, Hanser 1983, Franck & Biederbick, Kunststoff Kompendium Würzburg (=Würzburg Plastics Compendium), Vogel 1984.

Suitable thermoplastic synthetics according to the invention include thermoplastic and aromatic polycarbonates, particularly those based on diphenols of Formula (1)

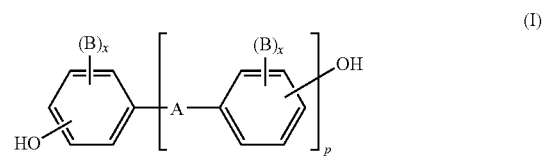

where
A can be a single bond, $C_1$-$C_5$-alkylene, $C_2$-$C_5$-alkylidenes, $C_5$-$C_6$-cycloalkylidenes, —S—, —$SO_2$—, —O—, —CO—, or a $C_6$-$C_{12}$-arylene residue, which may as appropriate be compensated with aromatic rings containing hetero atoms,
residue B refers to the following, independent of each other, $C_1$-$C_8$-alkyl, $C_5$-$C_{10}$ aryl, with particular preference to phenyl, $C_7$-$C_{12}$-aralkyl, preferably benzyl, halogen, preferably chlorine, bromine,
x independent of each other: 0, 1 or 2 and
p signifies 1 or 0.

or alkyl-substituted dihydroxy phenyl cyclo-alkanes of Formula (II),

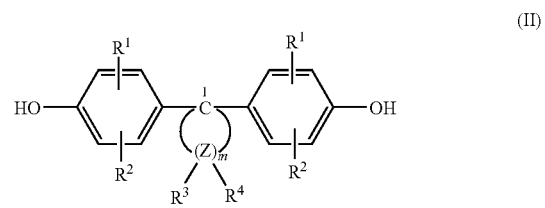

where
$R^1$ and $R^2$, independent of each other, are hydrogen, halogen, preferably chlorine or bromine, $C_1$-$C_8$ alkyl, $C_5$-$C_6$ cyclo-alkyl, $C_6$-$C_{10}$ aryl, preferably phenyl, and $C_7$-$C_{12}$ aralkyl, preferably phenyl-$C_1$-$C_4$ alkyl, particularly benzyl,
m is an integer from 4 to 7, preferably 4 or 5.
$R^3$ and $R^4$ for each individually selectable value of Z, hydrogen or $C_1$-$C_6$ alkyl, preferably hydrogen, methyl or ethyl.
and
Z relates to carbon, with the provision that on at least one atom $R^3$ and $R^4$ simultaneously signify alkyl.

Suitable diphenols as per Formula (I) are, for example, hydroquinone, resorcin, 4,4'-dihydroxydiphenyl, 2,2-bis-(4-hydroxyphenyl)-propane, 2,4-bis-(4 hydroxyphenyl)-2-methyl butane, 1,1-bis-(4-hydroxyphenyl)-cyclohexane, 2,2-bis-(3-chloro-4-hydroxyphenyl)-propane, 2,2-bis-(3.5-dibromo-4-hydroxyphenyl)-propane.

Preferred diphenols as per Formula (I) are 2,2-bis-(4-hydroxyphenyl)-propane, 2,2 bis-(3,5-dichloro-4-hydroxyphenyl)-propane and 1,1-bis-(4-hydroxyphenyl)-cyclohexane.

Preferred diphenols of Formula (II) are dihydroxydiphenylcyclo-alkanes with 5 and 6 ring C-atoms in the cycloaliphatic residue [(m=4 or 5 in Formula (II)], such as—for example—diphenols of the following formulae:

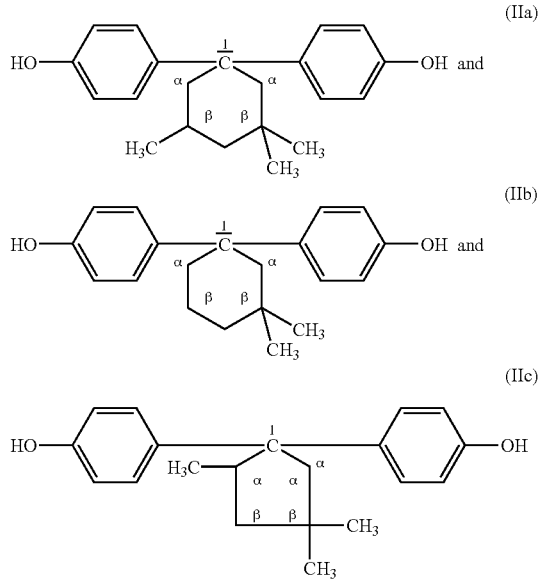

where 1,1-bis-(4-hydroxyphenyl)-3,3,5-trimethylcyclohex-yne (Formula IIc) is particularly preferred.

Polycarbonates which are suitable under the invention can be branched as known, preferably by integration of 0.05 to 2.0% molecular, in relation to the total of employed diphenols, on triple-function or more than triple-function compounds, e.g. those with three or more than three phenolic groups, for example:
Phloroglucinol,
4,6-dimethyl-2,4,6-tri-(4-hydroxyphenyl)-heptene-2,
4,6-dimethyl-2,4,6-tri-(4-hydroxyphenyl)-heptene,
1,3,5-tri-(4-hydroxyphenyl)-benzol
1,1,1-tri-(4-hydroxyphenyl)-ethane,
Tri-(4-hydroxyphenyl)-phenylmethane,
2,2-bis-(4,4-bis-(4-hydroxyphenyl)-cyclohexyl)-propane,
2,4-bis-(4-hydroxyphenyl)-isopropyl) phenol,
2,6-bis-(2-hydroxy-5'-methyl-benzyl)-4-methylphenol,
2-(4-hydroxyphenyl)-2-(2,4-dihydroxyphenol)-propane,
Hexa-(4-(4-hydroxyphenyl-isopropyl)-phenyl)-ortho-terephthalic acid resin,
Tetra-(4-hydroxyphenyl)-methane,
Tetra-(4-(4-hydroxyphenyl-isopropyl)-phenoxy)-methane and
1,4-bis-((4'-,4"-dihydroxytriphenyl)-methyl)-benzol.

Some of the other triple-functional compounds are 2,4-dihydroxybenzoe acid, trimesic acid, trimellitic acid, cyanuric chloride and 3,3-bis-(3-methyl-4-hydroxyphenyl)-2-oxo-2,3-dihydroindol.

Preferred polycarbonates are, in addition to bisphenol-A-homopolycarbonate the copolycarbonates of bisphenol. A with up to 15 molecular % in relation to the molecular totals of diphenols, of 2,2-bis-(3,5-dibromo-4-hydroxyphenyl)-propane.

The employed aromatic polycarbonates can partially be replaced by aromatic polyester carbonates.

Aromatic polycarbonates and/or aromatic polyester carbonates can be manufactured as known in literature on the subject or according to processes known in literature on the subject (refer, for examples of manufacture of aromatic polycarbonates, Schnell "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; and, for production of aromatic polyester carbonates, for example, DE-OS 3 077 934).

Aromatic polycarbonates and/or aromatic polyester carbonates can, for example, be manufactured by conversion of diphenols with carbonic halides, preferably phosgene and/or with dicarbonic dihalides, preferably benzol dicarbonic halides, in accordance with the interphase method, where appropriate including the use of chain-breakers and possibly involving triple-functional or more than triple-functional branching agents.

Furthermore, styrene copolymerisates of one or at least two ethylene unsaturated monomers (vinyl monomers) are suitable as thermoplastic synthetics, such as, for example, those of styrene, alpha-methyl styrene, atomic-substituted styrenes, acryl nitrile, methacryl nitrile, methyl methacrylate, maleic anhydride, N-substituted maleinimides and (meth) acrylate esters with 1 to 18 C-atoms in the alcohol component.

Copolymerisates are resinous, thermoplastic and rubber-free.

Preferred styrene-copolymerisates are those made of at least one monomer from the range of styrene, alpha-methyl styrene and/or atomic-substituted styrene with at least one monomer from the range of acryl nitrile, methacryl nitrile, methyl methacrylate, maleic acid anhydride and/or N-substituted maleinimide.

Particularly preferred weight relationships in thermoplastic copolymerisate are 60 to 95% by weight of styrene monomers and 40 to 5% by weight of the other vinyl monomers.

Particularly preferred copolymerisates are those of styrene with acryl nitrile and, where appropriate, with methyl methacrylate, from alpha-methyl styrene with acryl nitrile and, where appropriate, with methyl methacrylate, or from styrene and alpha-methyl styrene with acryl nitrile and, where appropriate, with methyl methacrylate.

Styrene-acryl nitrile copolymerisates are known and can be produced by radical polymerisation, particularly by emulsion, suspension, solution or mass polymerisation. Copolymerisates preferably have molecular weights $M_w$ (weighting averages, to be determined by light scatter or sedimentation) of between 15,000 and 200,000 g/mol.

Particularly preferred copolymerisates are also statistically constructed copolymerisates of styrene and maleic anhydride, which can preferably be produced by a continuous mass or solution polymerisation in the case of incomplete conversions from the corresponding monomers.

The proportions of both components of statistically constructed styrene maleic acid anhydride copolymers which experience shows to be suitable can be varied within wide limits. The preferred content of maleic acid anhydride is 5 to 25% by weight.

In place of styrene it is possible for polymers also to contain atomic substituted styrenes such as p-methyl styrene, 2,4-dimethyl styrene and other substituted styrenes such as alpha-methyl styrene.

Molecular weights (numerical average $M_n$) of styrene maleic acid anhydride copolymers may vary over a wide range. Preference is given to the range of 60,000 to 200,000 g/mol. A preferred limit viscosity for these products is 0.3 to 0.9 (measured in dimethyl formamide at 25° C.; in this instance refer to Hoffmann, Krömer, Kuhn, Polymeranalytik I (Polymer Analysis I), Stuttgart, 1977, pages 316 and following pages).

Graft copolymerisates are also suitable as thermoplastic synthetics. These include graft copolymerisates with rubber-elastic characteristics which can be obtained from at least two of the following monomers: chloroprene, butadiene-1,3, isopropene, styrene, acryl nitrile, ethylene, propylene, vinyl acetate and (meth)-acrylate ester with 1 to 18 C-atoms in the alcohol component; i.e. polymerisates, as described, for example, in "Methoden der Organischen Chemie" (Organic Chemistry Methods) (Houben-Weyl), volume 14/1, Georg Thieme-Verlag, Stuttgart 1961,pages 393-406 and in C. B. Bucknall, "Toughened Plastics", Appl. Science Publishers, London 1977. Preferred graft polymerisates are partially interlinked and have gel contents of more than 20% by weight, preferably over 40% by weight, and particularly over 60% by weight.

Preferred graft copolymerisates to be used are, for example, copolymerisates from styrene and/or acryl nitrile and/or (meth)-acrylate alkyl esters grafted on polybutadiene, butadiene/styrene copolymerisates and acrylate rubbers; i.e. copolymerisates of the type described in DE-OS 1 694 173 (=U.S. Pat. No. 3,564,077); polybutadienes, butadiene/styrene or butadiene/acryl nitrile copolymerisates, polyisobutenes or polyisoprenes, grafted with acrylate or methacrylate alkyl esters, vinyl acetates, acryl nitrile, styrene and/or alkyl styrenes, as described, for example, in DE-OS 2 348 377 (=U.S. Pat. No. 3,919,353).

Particularly suitable polymerisates are, for example, ABS polymerisates such as are described, for example, in DE-OS 2 035 390 (=U.S. Pat. No. 3,644,574) or in DE-OS 2 248 242 (=GB-PS 1 409 275).

Graft copolymerisates can be manufactured in accordance with known processes such as mass, suspension, emulsion or mass/suspension processes.

It is possible to use, as thermoplastic polyamides, polyamide 66 (polyhexamethylene adipine amide) or polyamides of cyclic lactams with 6 to 12 C-atoms, preferably from lauric lactam and particularly preferably eta-caprolactam-polyamide 6 (polycaprolactam) or copolyamides with main constituents 6 or 66, or mixes with the main constituent of the said polyamides. Preference goes to polyamide 6 manufactured by activated anionic polymerisation or copolyamide manufactured by activated anionic polymerisation, whose main constituent is polycaprolactam.

The reservoir coating contains a freely moveable repellent agent. The proportion of repellent agent in relation to the reservoir coating particularly amounts to 0.001% volume to 99% volume, preferably of 0.005% volume and 50% volume, particularly preferably of 0.01% volume and 10% volume and especially preferably of 0.1% volume and 5% volume.

Surface-active compounds of any molecular weight must be regarded as water-repellent and/or oil-repellent agents. These compounds are preferably cationic, anionic, amphoteric or non-ionic surface active compounds, such as those listed in the index of "Surfactants Europa, A Dictionary of Surface Active Agents available in Europe, edited by Gordon L. Hollis, Royal Society of Chemistry, Cambridge, 1995.

The following can be mentioned as examples of anionic repellent agents: alkyl sulphates, ether sulphates, ether carboxylates, phosphate esters, sulfosuccinate, sulfosuccinatamides, paraffin sulphonates, olefin sulphonates, sarcosinates, isothionates, taurates and lignin bonds.

Quaternary alkyl ammonium compounds and imidazole can be mentioned as examples of cationic repellent agents.

Examples of amphoteric repellent agents are: betaine, glycinate, propionate and imidazole.

Examples of non-ionic repellent agents are: alkoxylates, alkyloamides, ester, amine oxides and alkypolyglycosides.

Other products of conversion of alkylene oxides with alkylatable compounds, such as aliphatic alcohols, aliphatic amines, aliphatic acids, phenols, alkyl phenols, aryl alkyl phenols, such as styrene phenol condensates, carbonic acid amides and resin acids are also relevant.

Particular preference is given to repellent agents in respect of which there is 1-100% replacement of hydrogen atoms by fluorine atoms, particular preference being given to those with 60-95% substitution. Some examples are: perfluorated alkyl sulphate, perfluorated alkyl sulphonate, perfluorated alkyl phosphonate, perfluorated alkyl phosphinate and perfluorated carbonic acids.

Preference is given, for purposes of polymeric repellent agents, to the water-repellent coating, or, as a polymeric water-repellent material for the surface, to compounds with a molecular weight of $M_w$ of >500 to 1,000,000, preferably 1,000 to 500,000 and particularly preferably 1,500 to 20,000. These polymeric repellent agents can be non-ionic, anionic, cationic or amphoteric compounds.

Furthermore, these polymeric repellent agents can be homopolymerisates and copolymerisates, graft polymerisates and graft copolymerisates and statistical block polymers.

Particular preference goes to polymeric repellent agents of the AB, BAB and ABC block polymer type. Amongst AB or BAB block polymers, the A segment is a hydrophilic homopolymer or copolymer, and the B-block is a water-repellent homopolymer or copolymer or a salt thereof.

Particular preference is also given to anionic, polymeric repellent agents, particularly products of condensation of aromatic sulphonic acids with formaldehyde and alkyl naphthalene sulphonic acids or those of formaldehyde, naphthalene sulphonic acids and/or benzol sulphonic acids, products of condensation from similarly substituted phenol with formaldehyde and sodium bisulphite.

Furthermore, preference is given to products of condensation which can be obtained by conversion of naphthols with alkanols, additions of alkylene oxide and at least partial transfer of terminal hydroxy groups to sulpho groups or semi-esters of maleic acid and phthalic acid or succinic acid.

In a different preferred specification of the process under this invention, the repellent agent is obtained from the group of sulpho-succinate esters and alkyl benzol sulphonates. Preference also goes to sulphated, alkoxylated aliphatic acids or their salts. Alkoxylated aliphatic acid alcohols are in particular those $C_6$-$C_{22}$ aliphatic alcohols which have 5 to 120 ethylene oxides, those with 6 to 60, and especial preference goes to those with 7-30 ethylene oxides, the alcohols being saturated or non-saturated, with particular reference to stearyl alcohol. Sulphated alkoxylated aliphatic alcohols are present preferably as a salt, in particular as alkaline or amine salts, preferably as diethyl amine salts.

The covering coating consists in particular of a metal oxide, metal carbide, metal nitride, metal sulphide, metal fluoride or a compound of these materials.

Particular preference goes to the metal, for the metal compound of the covering coating, from the range of: beryllium, magnesium, scandium, titanium, vanadium, chromium, manganese, iron, cobalt, nickel, copper, zinc, gallium, yttrium, zircon, niobium, molybdenum, technetium, ruthenium, rhenium, palladium, silver, cadmium, indium, tin, lanthanum, cerium, praseodymium, neodymium, samarium, europium, gadolinium, terbium, dysprosium, holmium, erbium, thulium, ytterbium, lutetium, hafnium, tantalum, wolfram, rhenium, osmium, iridium, platinum, gold, thallium, lead, bismuth, and in particular titanium, aluminium, magnesium, nickel or an alloy of the above mentioned metals.

Particular preference goes to generation of the covering coating by vaporisation or atomisation of the said coating materials, with deposition on the reservoir coating.

As a similarly preferred preference, the surface of the covering coating exhibits a surface topography as described in the international patent application of case reference PCT/99/10322. In this context, surface topography is constructed such that the value of the integral of a function S $$S(\log f) = a(f) \cdot f$$

which states a relationship between local frequencies f of the individual Fourier components and their amplitudes a(f), between integration limits $\log(f_1/\mu m^{-1}) = -3$ and $\log(f_2/\mu m^{-1}) = 3$, is at least 0.3.

In this case, the boundary angle in relation to water is markedly higher than that of a non-structured, flat surface.

For surfaces according to the invention, there is a wide range of technical possibilities for applications. Consequently, the subject of this invention also relates to the following applications of repellent-treated surfaces under the invention:

In the case of transparent materials, repellent-treated surfaces can be used as the window or as the covering coating of transparent windows, in particular glass or plastic windows, particularly those of solar cells, vehicles, aircraft or houses.

A further utilisation is for frontage components on buildings, in order to protect them from wet.

Below, we explain the invention in the light of figures and examples.

The following figures illustrate:

FIG. 1 cross-section of surface

FIG. 1a an enlarged extract from the surface as per FIG. 1

EXAMPLE

1. Production of Reservoir Coating
   The mixture of
   30 g o-trifluoro methyl styrene
   70 g Zonyl-TA-N (compound of formula: $C_9F_{19}CH_2CH_2O$—CO—$C(CH_3)$=$CH_2$)
   1 g azo bis isobutyronitrile and
   100 g methyl isobutyl ketone is dripped for 2 hours at 90° C. into a flask, and the mixture is stirred for 16 hours. Next, the mixture is heated to 120° C. for 1 hour. Next, 1 g of Zonyl alcohol [$C_9F_{19}CH_2CH_2OH$] of diffusing repellent agent is added to the mix.

A glass panel 4 mm thick serves as the substrate 1. Using a film-drawing frame, a surface of 50×50 mm² of the glass panel is coated with a wet film thickness of 200 µm and dried for 24 hours at 80° C.

2. Production of Covering Coating 3
   Reservoir coating 2 was applied by electron gun vaporisation at a substrate temperature of 353K, a rate of 0.35 nm/s at a pressure of $1 \times 10^{-4}$ mbar with a 1 µm thick $ZrO_2$ coating.

3. Production of Pores 4
   The production of pores 4 in covering coating 3 is performed by laser ablation with a pulsed UV laser at 193 nm with pulsing power of 4 J/cm² pulses. Recourse is had to an ArF Excimer Laser, of the Lambda 1000 Type from Lambda Physik. The beam section of approximately 20 µm diameter was generated by an aperture.

Using this device, at a repetition frequency of 20 Hz with 10 pulses, the hole 4 illustrated in FIG. 1a, in covering coating 3 of diameter 20 µm is produced. Overall, 4×4 pores 4 were introduced on covering coating 3 at a distance between adjacent pores 4 of 10 mm.

Next, the correspondingly produced specimen is kept heated for 24 hours at 100° C.

The water boundary angle of the achieved surface, after production, is 132°. Analysis of outer coating 5 of the surface was performed using x-ray photo-electron spectroscopy (XPS) with polychromatic MgKα excitation at 0° electron output angle over a surface of a diameter of approximately 150 µm. Surface analysis produced a relative fluorine component of 52% atomic. In addition, a proportion of 1.0% atomic Zr, 41% atomic C and 5% atomic O was certified. Under the employed analysis conditions, this Zr proportion indicates a coating thickness of the water-repellent film of the order of magnitude of 5 nm (refer to the following work in relation to this method of analysis: D. Briggs, M. P. Seah, Practical Surface Analysis, Vol. 1, Wiley, Chichester, 1990).

To test the durability of the coating, outer coating 5 is entirely removed by ion bombardment with Ar ions with power of 500 eV over a surface of 10×10 mm². After ion bombardment, no further fluorine could be found on the bombarded surface. XPS analysis indicates a pure $ZrO_2$ coating. After bombardment, the water boundary angle was only 30°. In the course of a day, however, the surface composition once again changed to the values which were present before ion bombardment, and the water boundary angle increased to 130°. Accordingly, outer coating 5 is self-sustaining.

The proportion of dissolved repellent agent Zonyl alcohol $C_9F_{19}CH_2CH_2OH$ present in reservoir coating 2, of 1%, is adequate, with regard to the coating thickness of outer coating 5, of approximately 5 nm, for approximately 200 total replacements of water-repellent outer coating 5. With a weathering period under normal conditions of approximately one month, the useful life of the outer coating and the stability of the boundary angle can therefore be predicted to be about 17 years.

What is claimed is:

1. Material having a long-term stable water-repellent or oil-repellent surface made up at least of a substrate (1) with a reservoir coating (2) arranged thereon and containing a freely movable repellent agent, a covering coating (3) which is arranged thereover and is provided with pores (4) or which is permeable to the repellent agent, and an outer coating (5) which is made up of the repellent agent, in which context a water-repellent surface exhibits a boundary angle in relation to water of greater than 90° and an oil-repellent surface exhibits a boundary angle in relation to n-decane of greater than 90°.

2. The material as claimed in claim 1, wherein the outer surface of covering coating (3) exhibits a surface topography which is configured such that the value of the integral of a function S $$S(\log f) = a(f) \cdot f$$

which states a relationship between local frequencies f of the individual Fourier components and their amplitudes a(f), between integration limits $\log(f_1/\mu m^{-1}) = -3$ and $\log(f_2/\mu m^{-1}) = 3$, is at least 0.3.

3. The material as claimed in claim 1, wherein the reservoir coating (2) exhibits a coating thickness in the range of 0.1 µm to 10,000 µm.

4. The material as claimed in claim 1, wherein the covering coating (3) exhibits a coating thickness in the range of 0.01 µm to 100 µm.

5. The material as claimed in claim 1, wherein the pores (4) exhibit a cylindrical or conical form in transverse section along their longitudinal axis.

6. The material as claimed in claim 1, wherein the aperture section of the pores (4) at the boundary surface to the reservoir coating (2), which may independently be the same or different at the boundary surface in relation to the outer coating, is from $10^{-5}$ μm$^2$ up to $10^6$ μm$^2$.

7. The material as claimed in claim 6, wherein the aperture section of the pores (4) at the boundary surface to the reservoir coating (2), which may independently be the same or different at the boundary surface in relation to the outer coating, is from $4 \times 10^{-4}$ μm$^2$ to $4 \times 10^4$ μm$^2$.

8. The material as claimed in claim 6, wherein the aperture section of the pores (4) at the boundary surface to the reservoir coating (2), which may independently be the same or different at the boundary surface in relation to the outer coating, is from $1 \times 10$ μm$^2$ to $1 \times 10^4$ μm$^2$.

9. The material as claimed in claim 6, wherein the aperture section of the pores (4) at the boundary surface to the reservoir coating (2), which may independently be the same or different at the boundary surface in relation to the outer coating, is from $2 \times 10^4$ μm$^2$ to $2 \times 10^3$ μm$^2$.

10. The material as claimed in claim 1, wherein the quantity of pores (4) per unit surface area is from 2 mm$^{-2}$ to $10^{-4}$ mm$^{-2}$.

11. The material as claimed in claim 10, wherein the quantity of pores (4) per unit surface area is from 1 mm$^{-2}$ to $10^{-3}$ mm$^{-2}$.

12. The material as claimed in claim 10, wherein the quantity of pores (4) per unit surface area is from 0.5 mm$^{-2}$ to $10^{-2}$ mm$^{-2}$.

13. The material as claimed in claim 1, wherein the substrate (1) consists of a transparent material.

14. The material as claimed in claim 13, wherein the transparent coating material is selected from the group consisting of glass, plastic and ceramics.

15. The material as claimed in claim 1, wherein the reservoir coating (2) is selected from the group consisting of an open/porous coating of metal, an open/porous coating of a ceramic material, a duroplastic material and a thermoplastic material.

16. The material as claimed in claim 15, wherein the reservoir coating (2) is selected from glass, plastic and ceramic materials.

17. The material as claimed in claim 1, wherein the proportion of the repellent agent in relation to reservoir coating (2) is from 0.001% volume to 99% volume.

18. The material as claimed in claim 17, wherein the proportion of the repellent agent in relation to reservoir coating (2) is from 0.005% volume to 50% volume.

19. The material as claimed in claim 17, wherein the proportion of the repellent agent in relation to reservoir coating (2) is from 0.01% volume to 10% volume.

20. The material as claimed in claim 17, wherein the proportion of the repellent agent in relation to reservoir coating (2) is from 0.1% volume to 5% volume.

21. The material as claimed in claim 1, wherein the covering coating (3) is selected from the group consisting of a metal oxide, metal carbide, metal nitride, metal sulfide, metal fluoride and combinations of these materials.

22. The material as claimed in claim 1, wherein the pores (4) are produced by ablation with lasers.

23. The material as claimed in claim 22, wherein the laser is an ultra violet laser.

24. The material as claimed in claim 23, wherein the wavelength of the laser is selected from the group consisting of 308 nm, 266 nm, 248 nm, 213 nm, 193 nm and 157 nm wavelength lasers.

25. The material as claim 1, wherein the covering coating (3) exhibits a coating thickness in the range of 0.02 μm to 50 μm.

26. The material as claimed in claim 1, wherein the covering coating (3) exhibits a coating thickness in the range of 0.05 μm to 20 μm.

27. The material as claimed in claim 1, wherein the covering coating (3) exhibits a coating thickness in the range of 0.1 μm to 10 μm.

28. The material as claimed in claim 1, wherein the reservoir coating (2) exhibits a coating thickness in the range of 1 μm to 2,000 μm.

29. The material as claimed in claim 1, wherein the reservoir coating (2) exhibits a coating thickness in the range of 10 μm to 1,000 μm.

30. The material as claimed in claim 1, wherein the reservoir coating (2) exhibits a coating thickness in the range of 50 μm to 500 μm.

31. The material as claimed in claim 1 wherein the substrate comprises frontage components of buildings.

32. A long-term stable water-repellent or oil-repellent surface comprising
    a substrate;
    a reservoir coating arranged on the substrate, such reservoir coating containing a porous matrix and a repellent agent located within the porous matrix,
    a cover coating arranged on the reservoir coating where the cover coating is either porous or is permeable to the repellent agent, and
    an outer coating of the repellent agent arranged on the cover coating.

33. The long-term stable water-repellent or oil-repellent surface of claim 32 where the repellent agent is freely moving.

34. The long-term stable water-repellent or oil-repellent surface of claim 33 where the repellent agent is continuously supplied to the outer coating through the pores in the covering coating.

* * * * *